United States Patent
Moffett

(10) Patent No.: US 10,519,381 B2
(45) Date of Patent: Dec. 31, 2019

(54) BITUMEN EXTRACTION PROCESS

(71) Applicant: THE CHEMOURS COMPANY FC LLC, Wilmington, DE (US)

(72) Inventor: Robert Harvey Moffett, Landenberg, PA (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

(21) Appl. No.: 14/648,734

(22) PCT Filed: Dec. 10, 2013

(86) PCT No.: PCT/US2013/073992
§ 371 (c)(1),
(2) Date: Jun. 1, 2015

(87) PCT Pub. No.: WO2014/099459
PCT Pub. Date: Jun. 26, 2014

(65) Prior Publication Data
US 2015/0299580 A1    Oct. 22, 2015

Related U.S. Application Data

(60) Provisional application No. 61/739,264, filed on Dec. 19, 2012.

(51) Int. Cl.
| | | |
|---|---|---|
| C10G 1/04 | (2006.01) | |
| B09B 3/00 | (2006.01) | |
| C04B 18/04 | (2006.01) | |
| C10G 21/26 | (2006.01) | |
| C10G 33/00 | (2006.01) | |
| C10G 1/00 | (2006.01) | |
| C10G 19/02 | (2006.01) | |
| C10G 21/14 | (2006.01) | |
| B03D 1/24 | (2006.01) | |

(52) U.S. Cl.
CPC ............ *C10G 1/045* (2013.01); *B09B 3/0016* (2013.01); *C04B 18/049* (2013.01); *C10G 1/002* (2013.01); *C10G 1/047* (2013.01); *C10G 19/02* (2013.01); *C10G 21/14* (2013.01); *C10G 21/26* (2013.01); *C10G 33/00* (2013.01); *B03D 1/247* (2013.01); *Y02W 30/91* (2015.05)

(58) Field of Classification Search
CPC ... B09B 3/0016; C04B 18/049; C04B 20/023; C10G 33/00; C10G 1/002; C10G 1/045; C10G 1/047; C10G 19/02; C10G 21/14; C10G 21/26; B03D 1/247; Y02W 30/91
USPC .................................................. 208/390, 391
See application file for complete search history.

(56) References Cited

U.S. PATENT DOCUMENTS

| | | | |
|---|---|---|---|
| 2,244,325 A | 4/1940 | Bird | |
| 3,496,093 A | 2/1970 | Camp | |
| 3,668,088 A | 6/1972 | Iler | |
| 4,795,531 A | 1/1989 | Sofia et al. | |
| 5,126,014 A | 6/1992 | Chung | |
| 5,470,435 A | 11/1995 | Rushmere et al. | |
| 5,482,693 A | 1/1996 | Rushmere et al. | |
| 5,543,014 A | 8/1996 | Rushmere et al. | |
| 5,626,721 A | 5/1997 | Rushmere et al. | |
| 5,876,592 A | 3/1999 | Tipman et al. | |
| 2004/0097600 A1 | 5/2004 | Greenwood et al. | |
| 2009/0236065 A1* | 9/2009 | Saastamoinen | D21H 17/68 162/164.1 |
| 2010/0101981 A1 | 4/2010 | Moffett et al. | |
| 2010/0104744 A1 | 4/2010 | Moffett | |
| 2010/0126910 A1 | 5/2010 | Moffett et al. | |

FOREIGN PATENT DOCUMENTS

| | | |
|---|---|---|
| EP | 491879 B1 | 6/1994 |
| EP | 502089 B1 | 6/1994 |
| JP | 1995000803 | 1/1995 |
| JP | 2002079527 | 3/2002 |
| JP | 2002220220 | 8/2002 |
| JP | 2003236345 | 8/2003 |
| JP | 2003311130 | 11/2003 |
| JP | 2004320026 | 11/2004 |
| WO | 199107350 A1 | 5/1991 |
| WO | 199107351 A1 | 5/1991 |
| WO | 2003033618 A1 | 4/2003 |
| WO | 2005028592 A1 | 3/2005 |
| WO | 2012088262 A1 | 6/2012 |

OTHER PUBLICATIONS

Iler., The Chemistry of Silica, Wiley Intersciene, 1979, p. 116.
Li, et al., Ind. Eng. Chem. Res., 2005, vol. 44, pp. 4753-4761.
Li, et al., Energy & Fuels, 2005, vol. 19, pp. 936-943.
Liu et al., AICHE Journal, 50, 8, Aug. 1, 2004, 1917-1927.
Masliyah et al., The Canadian Journal of Chemical Engineering, 82, 2004, 628-654.
International Search Report, PCT/US2013/073992, dated Apr. 11, 2014.

* cited by examiner

Primary Examiner — Prem C Singh
Assistant Examiner — Brandi M Doyle

(57) ABSTRACT

A process for the extraction and recovery of bitumen from oil sands using deionized silicate solutions. Bitumen is recovered in a process comprising contacting a deionized silicate solution with an ore sand oil to produce a froth comprising bitumen and a tailings stream comprising water, sand and clay fines and optionally unrecovered bitumen. Preferably the tailings stream is dewatered and recovered water may be recycled to the extraction process.

19 Claims, No Drawings

BITUMEN EXTRACTION PROCESS

FIELD OF THE INVENTION

The present invention relates to a process for extraction of bitumen from oil sands ores using a deionized silicate source.

BACKGROUND OF THE INVENTION

Oil sands have become an attractive source of oil to support global demand for oil. Oil sands are large deposits of naturally occurring mixtures of bitumen, water, sand, clays, and other inorganic materials found on the earth's surface. Bitumen is a highly viscous form of crude oil. The largest oil sands deposits are found in Canada and Venezuela. In particular, the Athabasca oil sands deposit is equivalent to 1.6 to 2.7 trillion barrels of oil, and is located in the Canadian provinces of Alberta and Saskatchewan. About 10% of the Athabasca oil sands deposit can be mined. Once the oil sands are mined, it is processed by extracting the bitumen.

The bitumen must be extracted and separated from the water, sand and fine clays of the oil sands. Today, the oil sands are mined, crushed, then mixed with hot water, and optionally chemicals, to facilitate extracting the bitumen from the sand and clay fines. The extracted bitumen is separated from the sands and fine clays and is then refined. The remaining sand, fine clays and water, commonly referred to as "tailings", are further processed to dewater the sand and fine clays. The sand and clay fines are typically disposed, e.g., in a tailings pond where the fine particulates settle, in a dewatering step, to become mature fine tailings. Mature fine tailings are a stable slurry comprising clay, fine sands, water and bitumen. Mature fine tailings have no strength, no vegetative potential and can be toxic to animal life, so the tailings must be confined and prevented from contaminating water supplies. The recovered water from the dewatering step may be re-used in the extraction process. Faster recovery of the water reduces heat energy requirements when this water is recycled for use in the extraction process.

The recovered bitumen from this process is in the form of a froth. The froth comprises a concentrated bitumen (typically 50% or greater), water, fine sand and clays. The froth is treated in a froth treatment unit, which may use steam (to de-aerate the froth) and a naphthenic or paraffinic solvent to recover a bitumen with greater than 95% purity. A byproduct of the froth treatment process is a froth treatment tailings. The froth treatment tailings comprise water, residual solvent, and fine solids that are primarily smaller than 44 micrometers in size. The froth treatment tailings are typically disposed of in a tailings pond. Froth treatment tailings may contribute to mature fine tailings formation.

Extraction of bitumen from sand and clay fines, as well as dewatering of the sand and clay fines for disposal, are especially difficult for so-called "poor quality ores." Generally, a poor quality ore, in reference to an oil sands ore is an oil sands ore that contains a large amount of fines that hinder, not only extraction of bitumen, but also the dewatering process of sand and clay fines. Poor quality ores also refer to oil sand ores with low bitumen content and oxidized ores. Poor quality ores are difficult to extract bitumen from at acceptable yields using conventional methods. In addition, more bitumen is retained in the tailings streams from extraction of poor quality ores, which is sent to the tailings pond as a yield loss. The tailings should be essentially free of bitumen and separated from water, so the water can be re-used and the solids can be returned to the environment free of bitumen, within environmental limits. Alberta government guidelines, as per Alberta Energy and Utilities Board Interim Directive ID 2001-7, require mining operations to recovery certain percentage of bitumen, depending on the starting bitumen content of the oil sands ore. For example, ores that contain 10% bitumen, oil producers are required to extract close to 90% bitumen. For poorer ore, such as 7%, oil producers are required to extract at least 55% bitumen. Traditional approaches however have difficulty meeting this government requirement on poorer ores.

Poor quality ores reduce yield by as much as 35 to 50% and are avoided when possible. Alternatively, poor quality ores are blended in limited quantities with good quality ores so they can be processed more effectively. With demand for oil increasing every year, there is a need to mine these poor quality ores and to produce high yield of bitumen. The conventional approach to utilize these poor quality ores is the use of chemical aids to improve bitumen yield Tipman et al., in U.S. Pat. No. 5,876,592, disclose recovery of bitumen from oil sands in a process comprising adding aqueous caustic to an oil sands slurry, to create an emulsion. The emulsion is allowed to separate into 3 layers, with a top layer of a first froth comprising bitumen, bottom layer, referred to as tailings, comprising water, sand and clay fines that settled, and a middle layer, referred to as middlings, comprising residual bitumen, suspended clay fines and water. The middlings are further processed to recover additional bitumen in the same manner as the oil sands slurry, producing a second froth. The second froth may be combined with the first froth to recover bitumen by dilution with a solvent and removal of sand and clay fines. Tipman's process results in increasing sodium concentrations in the tailings compared to the starting ore.

It has been shown that the presence of monovalent metal ions can reduce bitumen extraction efficiency by Masliyah et al., in Can. J. of Chem. Eng., August 2004, vol. 82, pp 628-654. Masliyah et al., disclose a reduction of bitumen recovery with the presence of 5 mM sodium ions, in the form of NaCl. Masliyah has also discussed the presence of multivalent ions also reduce bitumen extraction efficiency.

Moffett disclosed, in US-2010-0101981-A1, a process for extracting bitumen from an oil sands ore which comprises providing an aqueous slurry of an oil sands ore and contacting the slurry with a polysilicate microgel to produce a froth comprising bitumen and a tailings stream comprising sand and clay fines. Moffett teaches use of silica sols having a low S value, such as an S value of less than 50%. "Low S-value silica sols" are described in European patents EP 491879 and EP 502089. EP 491879 describes a silica sol having an S value in the range of 8 to 45% wherein the silica particles have a specific surface area of 750 to 1000 $m^2/g$, which have been surface modified with 2 to 25% alumina.

Polysilicate microgels contain residual sodium ions from the silica polymerization process. The sodium ions exchange can exchange with the multivalent ions present on the clays such as calcium and magnesium ions. Multivalent metal ions are known to reduce extraction efficiency of bitumen from oil sand ores. It is desirable to reuse the water in the extraction process to reduce the amount of fresh water needed for bitumen extraction. When the water containing these multivalent ions is used in a bitumen extraction process, it is known to reduce the bitumen extraction efficiency.

Alkali metal silicate solutions are distinct from colloidal silica sols by their ratio of silica to metal oxide ($SiO_2:M_2O$).

For example, solutions of sodium silicate have $SiO_2:Na_2O$ of less than 4:1, as disclosed by Iler, "The Chemistry of Silica", Wiley Interscience (1979), page 116. Iler further recited that "silicate solutions of higher ratios were not available."

Acidified sodium silicate solution has been used to enhance bitumen extraction by Masliyah, et al., Ind. Eng. Chem. Res., 2005, vol. 44, pp. 4753-4761. Although divalent metal ions can be sequestered by the addition of acidified silicates, the monovalent metal ions from the silicate solution are still present during extraction. There is a similar disadvantage with this process as found in WO 2005/028592, that is, solids are dispersed.

Li, et al., Energy & Fuels, 2005, vol. 19, pp. 936-943 disclose the effect of a hydrolyzed polyacrylamide (HPAM) on bitumen extraction and tailings treatment of oil sands ores. Although this process does not result in increased metal ions, careful control of HPAM dosage is necessary to achieve efficiency in both bitumen extraction and in flocculation of solid fines.

Under most conventional extraction processes, the monovalent metal ions are building in concentration, leading to reduced bitumen recovery or need to dilute or treat the recycle water. There is a desire to have reduced metal ions present during the extraction of bitumen. There is also a need to provide a simple, robust process for bitumen extraction wherein the water can be reused for future bitumen extractions without the need for excess fresh water or expensive capital investments to deionize the water. The present invention meets these needs.

SUMMARY OF THE INVENTION

The present invention is a process for the extraction/recovery of bitumen from oil sands and for the treatment of tailings. In one embodiment of this invention, the process comprises (a) providing an aqueous slurry of an oil sands ore and (b) contacting the slurry with a deionized silicate solution and optionally caustic, to extract bitumen from the ore to produce i) a froth comprising bitumen and ii) an aqueous tailings stream comprising sand and clay fines, wherein the deionized silicate solution has a molar ratio of Si:M of at least 2.6, wherein M is an alkali metal and the deionized silicate solution has a S-value of 50% or greater. The aqueous tailings stream is un-flocculated. The un-flocculated aqueous tailings stream comprising sand and clay fines can be flocculated in a later, separate step if desired. Preferably, the process further comprises (c) dewatering the tailings. Bitumen is recovered from the froth. Optionally, an anionic polyacrylamide or an anionic polyacrylamide and a low molecular weight cationic organic polymer may be added after step (b) and before step (c) to the aqueous tailings stream. The deionized silicate solution is carried through to a dewatering step and may enhance flocculation in said tailings.

DETAILED DESCRIPTION OF THE INVENTION

In a first embodiment of this invention, there is provided the process comprises (a) providing an aqueous slurry of an oil sands ore and (b) contacting the slurry with a deionized silicate solution and optionally a caustic, to extract bitumen from the ore to produce i) a froth comprising bitumen and ii) an aqueous tailings stream comprising sand and clay fines, wherein the deionized silicate solution has a molar ratio of Si:M of at least 2.6, wherein M is an alkali metal and the deionized silicate solution has a S-value of 50% or greater. The aqueous tailings stream is un-flocculated. The un-flocculated aqueous tailings stream comprising sand and clay fines can be flocculated, if desired, in a later, separate step. Preferably, the process further comprises (c) dewatering the tailings. Bitumen is recovered from the froth. Optionally, an anionic polyacrylamide or an anionic polyacrylamide and a low molecular weight cationic organic polymer may be added after step (b) and before step (c) to the aqueous tailings stream. The slurry of an oil sands ore may be produced by mining an oil sands ore, crushing the ore and adding water to produce a slurry. The froth produced from the process of the present invention comprises bitumen, clay fines and water. The tailings produced from the process of the present invention comprise sand, clay fines, reacted and unreacted deionized silicate solution and water. Preferably the process further comprises dewatering the tailings. The deionized silicate solution in the tailings may be carried through to a dewatering step.

Oil Sands Ore

Oil sands ores are large deposits of naturally-occurring mixtures comprising bitumen, sand, clays, and other inorganic materials. Herein, bitumen refers to hydrocarbons and other oils found in oil sands, tar sands, crude oil and other petroleum sources. The oil sands ores used in this invention are mined materials and typically comprise about 5 to 15 wt % bitumen. The oil sands ores further comprise water, sand and clay fines. Generally the oil sands ores comprise about 2 to 5 wt % water. Inorganic material can be naturally-occurring ores, such as titanium ores and zirconium ores that are present in the oil sands ore.

The process of this invention may be used advantageously to treat poor quality ores as well as good quality ores. The "poorer" the quality of the oil sands ore, the higher the level of clay fines and/or lower bitumen content. Surprisingly, the process of this invention is effective at extracting bitumen from poor quality oil sands ores.

Deionized Silicate Solution

A deionized silicate solution, useful in the present invention, may be prepared by any means known in the art. Ion exchange methods are disclosed, for example, by Bird, in U.S. Pat. No. 2,244,325. The deionized silicate solution may be prepared by contacting a solution of alkali metal silicate with a strong cation exchange resin or a weak cation exchange resin. The deionized silicate solution may alternatively be prepared by contacting a solution of alkali metal silicate with a weak ion exchange resin. The deionized silicate solution, as used herein has a molar ratio of Si:M of at least 2.6, preferably at least 4, wherein M is an alkali metal, such as lithium, sodium, potassium, or combinations thereof. More preferably the molar ratio is 5 or greater. Some caustic may be re-introduced to the deionized silicate solution prior to or during bitumen extraction to adjust pH. Care must be taken so that the added caustic does not provide a Si:M molar ratio less than 2.6 after such treatment. The caustic can be any compound capable of adding hydroxide to the solution. Preferably the caustic is one or more metal hydroxides, wherein the metal is sodium, potassium, magnesium, calcium, or mixtures thereof.

The deionized silicate solution useful in the present invention has an S-value of 50% or greater. In one embodiment, the S value is greater than 60%. In one embodiment, the S value is greater than 70%. In one embodiment, the S value is greater than 80%. "S value" is defined as the percentage of silica in the dispersed phase and can be obtained by viscosity measurement. Higher S values indicate well-dispersed, non-aggregated particles.

Iler, in U.S. Pat. No. 3,668,088, discloses a process to remove sodium cations from sodium silicate in an electrodialysis process wherein sodium silicate aqueous solution is electrolyzed while separated from an acid anolyte by a cation-permeable, anion-impermeable membrane.

A deionized silicate solution may be prepared by removing alkali metal from a solution of alkali metal silicate using bipolar electrolysis.

Other processes to prepare deionized silicate solutions include processes which rely on a combination of electrolysis and ion exchange membranes or ion-permeable membranes have been disclosed, for example, in JP 2003236345A, JP 2004323326A, JP 07000803A, JP 2002220220A, JP 2003311130A and JP 2002079527A.

More specifically, a sodium silicate (or water glass) solution may be contacted with a strong cation exchange resin. Strong cation exchange resins have sulfonic acid functionality, R—$SO_3H$, wherein R is the backbone of the resin or the matrix. The resin or matrix can be, for example, functionalized styrene divinylbenzene copolymers. Strong cation exchange resins are commercially available, for example, from Dow Chemical Company.

The deionized silicate solutions may be modified by alumina before or during or after the deionization process. Processes such as those disclosed in U.S. Pat. Nos. 5,482,693; 5,470,435; 5,543,014; and 5,626,721 can be used. Care must be taken when the process uses sodium aluminate so that the added sodium does not provide a Si:Na molar ratio less than 2.6 after such treatment.

The deionized silicate solution may be stabilized by methods known in the art, such as by control of pH or temperature.

A deionized silicate solution is an aqueous (water-based) solution. The solution has a molar ratio of Si:M of at least 2.6. M is an alkali metal, such as lithium, sodium, potassium, or combinations thereof. Preferably the molar ratio is 4 or greater, more preferably 5 or greater. The upper limit of Si:M molar ratio may be set by practical considerations, for example capacity of an ion exchange resin for a given quantity of silicate solution, or alternatively, a minimum threshold for sodium in a particular tailings treatment system, in particular when recovered water is recycled for re-use. The deionized silicate solution, useful in the present invention, may be partially or fully deionized.

The concentration of silica in the solution after deionization is 1-15% by weight, as "$SiO_2$", preferably 2-10%, more preferably 4-7%.

The deionized silicate solution may comprise particles, anions, and oligomers of silica. The silica specific surface area is greater than 500 $m^2/g$, typically greater than 750 $m^2/g$.

Deionized silicate solution useful in the present invention also includes deionized colloidal silica. Deionized colloidal silica can be prepared by first deionizing sodium silicate. The deionized sodium silicate solution is then grown into particles in a dispersion. The colloidal silica have particle sizes from about 1 to about 100 nm. The dispersion is then stabilized with limited amount of caustic.

Polyacrylamide

Polyacrylamides (PAMs) useful in the present invention include anionic, cationic, non-ionic and amphoteric polyacrylamides. Polyacrylamides are polymers formed by polymerization of acrylamide, $CH_2=CHC(O)NH_2$. Polyacrylamides of the present invention typically have a molecular weight greater than one million.

Preferably the PAM is an anionic polyacrylamide (APAM) or cationic polyacrylamide (CPAM), more preferably APAM. APAM and CPAM are the generic names for a group of very high molecular weight macromolecules produced by the free-radical polymerization of acrylamide and an anionically or a cationically charged co-monomer. APAM and CPAM can be prepared by techniques known to those skilled in the art, including but not limited to the Mannich reaction. Both the charge density (ionicity) and the molecular weight can be varied in APAM and CPAM. By varying the acrylamide/ionic monomer ratio, a charge density from 0 (nonionic) to 100% along the polymer chain can be obtained. The molecular weight is determined by the type and concentration of the reaction initiator and the reaction parameters.

Low Molecular Weight Cationic Organic Polymers

Low molecular weight cationic organic polymers which can be used in this invention have a number average molecular weight less than 1,000,000. Preferably, the molecular weight is in the range between about 2,000 to about 500,000, more preferably between 10,000 and 500,000. The low molecular weight polymer is typically selected from the group consisting of polyethylene imine, polyamine, polycyandiamide formaldehyde polymer, diallyl dimethyl ammonium chloride polymer, diallylaminoalkyl(meth)acrylate polymer, dialkylaminoalkyl(meth)acrylamide polymer, a copolymer of acrylamide and diallyl dimethyl ammonium chloride, a copolymer of acrylamide and diallylaminoalkyl (meth)acrylate, a copolymer of acrylamide and dialkyl-diaminoalkyl(meth)acrylamide, and a copolymer of dimethylamine and epichlorohydrin. Such polymers are described, for example, in U.S. Pat. Nos. 4,795,531 and 5,126,014. Low molecular weight cationic organic polymers are commercially available, for example, from SNF Floerger, Andrézieux, France as FLOQUAT FL 2250 and FLOQUAT FL 2449 and from FCT-Water Treatment, Greeley, Colo. as WT-530.

Extraction

Oil sands ores are generally mined from the earth and processed to remove the bitumen, which can then be further treated as a crude oil. In a first embodiment, an oil sands ore is provided. The oil sands ore is mined from an oil sand deposit and crushed to provide a material suitable for extracting bitumen from the ore. Conventional methods can be used for mining and crushing. The oil sands ore is generally processed as an aqueous slurry. Recycled water from a downstream dewatering step vida infra may be used to prepare the oil sands ore aqueous slurry.

The process of this invention comprises providing an aqueous slurry of an oil sands ore and contacting the slurry with a deionized silicate solution and optionally a caustic, to extract bitumen from the oil sands ore to produce i) a froth comprising bitumen and ii) an aqueous tailings stream comprising sand and clay fines wherein the deionized silicate solution has a molar ratio of Si:M of at least 2.6, wherein M is an alkali metal and the deionized silicate solution has a S-value of 50% or greater. The aqueous tailings stream is un-flocculated. Water and optionally air may be added to the slurry prior to or during contacting (extraction) in step (b) at a temperature in the range of 25 to 90° C. (77 to 194° F.), preferably at a temperature of 35 to 85° C. (95 to 185° F.). Advantageously the contacting step is performed at a temperature of 50° C. or less, for example, 35-50° C. (95-122° F.). The un-flocculated aqueous tailings stream comprising sand and clay fines and optionally unrecovered bitumen, can be flocculated in a later, separate step.

The amounts of the slurry components can vary. An aqueous slurry of an oil sands ore can be prepared by contacting an oil sands ore with water in an amount of 10% to 500%, based on the mass of the ore, preferably, 50% to 200%. The water may be recycled water from the extraction process. The amount of water added may be determined by extraction efficiency and by limitations of transfer lines used to convey the ore-containing slurry effectively through an extraction unit operation.

The deionized silicate solution is typically added in an amount of 100 to 10,000 g SiO2 per metric ton of the oil sands ore.

One or more of the following additives may be added to the oil sands ore slurry prior to contacting with the deionized silicate solution (extraction step (b)): one or more caustics, preferably one or more metal hydroxides, wherein the metal is sodium, potassium, magnesium, calcium, or mixtures thereof; organic acids and salts of organic acids, such as glycolic acid; surfactants, buffers such as bicarbonates, antimicrobial agents; or one or more mixtures of the additives thereof.

In the extraction step (b), the oil sands ore, microgel and water are mixed and optionally contacted with air, generally in the form of air bubbles, in a reaction vessel or in a transport line. Contact of the air bubbles with the slurry results in bitumen floating to the top of the slurry, creating a top layer, referred to as a froth, or a first froth, if multiple froths are produced in the process, and an aqueous tailings stream comprising sand and clay fines. The aqueous tailings stream is un-flocculated. The (first) froth comprises bitumen that has floated to the top of the slurry. Once the slurry has undergone a bitumen removal process, the remaining composition is herein referred to as "an aqueous tailings stream comprising sand and clay fines" and may also comprises some un-separated bitumen. The aqueous tailings stream comprising sand and clay fines is un-flocculated. The un-flocculated aqueous tailings stream comprising sand and clay fines, and optionally bitumen, can be flocculated in a later, separate step.

The process of the present invention may further comprises a step (d) permitting separation of the aqueous tailings stream into a middlings and a coarse tailings. Step (d) occurs after step (b) and prior to step (c). After forming a froth, the remainder of the aqueous tailings stream is permitted to separate in the reaction vessel or is transferred from a transport line to a separating vessel. The majority of the sand and clay fines settle to the bottom of the aqueous tailings stream forming a bottom layer, referred to as a coarse tailings. A middle layer is also formed in the aqueous tailings stream. The middle layer is a diluted portion of the aqueous tailings stream comprising bitumen that did not float to the top and sand and clay fines that did not settle to the bottom, and is referred to as middlings.

The middlings may be removed from the middle of the reaction or separation vessel. The removed middlings may be further processed by contacting with air as air bubbles or passing through one or more air flotation cells, where air bubbles enhance separation of the bitumen droplets from the solids (sand and clay fines) and water of the middlings, producing a (second) froth. The second froth may be recovered e.g., from the air flotation cell(s), and may be combined with a first froth. Deionized silicate solution may be added at this process step, typically in an amount of 25 to 5000 g per metric ton of the oil sands ore. Alternatively, the second froth may be added to the slurry comprising the oil sands ore and water prior to treating the slurry to produce the first froth.

After forming the second froth, the remainder of the aqueous tailings stream is permitted to separate in the reaction vessel or is transferred to a separating vessel. The majority of the sand and clay fines settle to the bottom of the aqueous tailings stream forming a bottom layer, referred to as a fine tailings, which comprise less sand and more fines than coarse tailings. A middle layer may also form in the aqueous tailings stream. Both the middle and bottom layers may be combined and treated downstream in a dewatering step as fine tailings.

Optionally, the middle layer that is formed with the second froth is removed as a second middlings and further treated with additional deionized silicate solution and air in the same manner as the (first) middlings, that is, treated with air to produce a third froth. The third froth may be combined with the first froth and second froth to recover bitumen. The third froth may added to the slurry comprising the oil sands ore and water prior to producing first froth, optionally being combined with the second froth. In still another alternative, the third froth may be combined with the middlings prior to contacting the middlings with air. A second fine tailings is also produced with the third froth.

Each successive formation of a froth removes more of the bitumen from the oil sands ore. Although producing only up to a third froth is described herein, successive froths (fourth, fifth, etc.) are contemplated within the scope of this invention.

The process of the present invention may further comprise removing the froth from the aqueous tailings and contacting the froth with solvent to extract bitumen from the froth and to produce a froth treatment tailings. The froth or froths may be removed from the top of the aqueous tailings stream in the extraction step(s) and transferred to a froth treatment unit. In the froth treatment unit, the froth(s) is contacted with a solvent to extract the bitumen from the froth and to concentrate the bitumen. Typically the solvent is selected from the group consisting of paraffinic $C_5$ to $C_8$ n-alkanes and naphthenic solvents. Naphthenic solvents are typically coker naphtha and hydrotreated naphtha having an end boiling point less than 125° C. A by-product from froth treatment unit is froth treatment tailings, which comprise very fine solids, hydrocarbons and water.

After treatment of the froth in the froth treatment unit, the concentrated bitumen product may be further processed to purify the bitumen.

The froth treatment tailings may be further treated in a separate dewatering step to remove water, which may be recycled in the process, from the solids which comprise clay fines and sand.

The process may further comprise dewatering tailings. The tailings can be one or more of any of the tailings streams produced in a process to extract bitumen from an oil sands ore. The tailings are one or more of the coarse tailings, fine tailings and froth treatment tailings. The tailings may be combined into a single tailings stream for dewatering or each tailings stream may be dewatered individually. Depending on the composition of the tailings stream, the additives may change, concentrations of additives may change, and the sequence of adding the additives may change. Such changes may be determined from experience with different tailings streams compositions.

The tailings stream comprises at least one of the coarse tailings, fine tailings and froth treatment tailings. This dewatering step may comprise contacting the tailings stream with an anionic polyacrylamide or an anionic polyacrylamide and a low molecular weight cationic organic polymer. The tailings stream may comprise deionized silicate solution from the extraction steps. Additional deionized silicate solution may be added if desired.

Dewatering may be accomplished by means known to those skilled in the art. Such means include use of thickeners, hydrocyclones and/or centrifuges, or by decantation and/or filtration, and/or flocculation, such as those described U.S. Patent Application US-2010-0126910, or by gelation of the solids, such as those described in US-2010-0104744. The dewatered solids should be handled in compliance with governmental regulations. Preferably, the separated water is recycled to the process ("recycled water"). For example, the recycled water is added to crushed oil sands ore for bitumen extraction. Recycled water may also be added to the process at any point where water is added.

Conventionally fine tailings and froth treatment tailings have been difficult to dewater effectively. Both comprise clay fines and unextracted bitumen. Such tailings after bitumen extraction have been sent to tailings pond and after time become mature fine tailings. Alternatively, the tailings may be chemically thickened to reduce the water content and referred to a thickened tails.

In alternatives to the process of this invention, there is a process to extract bitumen from a aqueous tailings stream comprising bitumen wherein the process comprises providing an aqueous tailings stream comprising bitumen, wherein the aqueous tailings stream is a middlings, a fine tailings or a froth treatment tailings, contacting the aqueous tailings stream with a deionized silicate solution to extract bitumen from the aqueous tailings stream, and produce a froth comprising bitumen and a second aqueous tailings stream. The second aqueous tailings stream is un-flocculated. The second aqueous tailings stream may comprise sand and clay fines and can be flocculated in a later, separate step. The second, un-flocculated aqueous tailings stream may also comprise residual bitumen that was not removed during the second extraction process and may be subjected to further extraction processes. Preferably the second aqueous tailings streams are dewatered. The contacting, extracting and dewatering steps are performed as described hereinabove.

The processes of this invention can be used to treat poor quality ores. Alternatively, a higher percentage of poor quality ores may be blended with good quality ores in the extraction and dewatering processes of this invention.

The processes of the present invention are robust and can be used to achieve desired levels of bitumen extraction and water recovery from both good and poor quality ores. Furthermore, the present invention provides a simpler separation process overall, reducing equipment, for example, eliminating the need for mechanical separation equipment. Still further the processes of the present invention may be used to treat fine tailings, to recover bitumen from such tailings, and to provide a mineral source, reducing the need for settling ponds.

EXAMPLES

The concepts described herein will be further described in the following examples, which do not limit the scope of the invention described in the claims.

Test Procedure

Bitumen extraction experiments were conducted following Syncrude method 2.1, Lab Scale Hot Water Extraction of Oil Sand. In this method 500 grams of oil sand ore and 150 mL of water are slurried in a specially designed lab scale bitumen extraction unit (BEU). The water/ore slurry is mixed and aerated for 10 minutes at a specified rate. One liter of flood water is then introduced and the floated, primary bitumen froth is recovered from the BEU. Further mixing and aeration allows the recovery of a secondary bitumen froth. After the BEU is drained, the BEU and agitator are rinsed with toluene which is collected as a tertiary froth. The froths are analyzed via Syncrudes's Dean-Stark/Soxhlet extraction method 2.9, Determination of Bitumen, Water and Solids Content of Froth (Classical). Results are reported as % bitumen recovered representing the total mass of bitumen collected in all three froths divided by the mass of bitumen in the 500 grams of ore added to the BEU.

Sample Preparation (1) Partially Deionized Silicate Solution

Partially deionized sodium silicate solution having a calculated $SiO_2$ concentration of 0.6 wt % was prepared by mixing 10.8 grams of 3.2 ratio, 41° Be sodium silicate solution (27.5% $SiO_2$) with 484 grams of deionized water. Approximately 10.2 grams of Dowex HCR-W2 H+ Form, spherical beads (16-40 mesh) ion exchange resin was added to the dilute silicate solution while rapidly stirring the mixture and measuring its pH. When the dilute silicate solution pH reached 9.0 the solution was poured through a filter paper to remove the ion exchange resin. ICP (Inductively Coupled Plasma) analysis of the dilute, partially deionized silicate solution showed it contained 2620 ppm $SiO_2$ and 325 ppm Na equivalent to a Si/Na ratio of 8.1.

(2) Fully Deionized Silicate Solution

A fully deionized sodium silicate solution having a calculated $SiO_2$ concentration of 1.0 wt % was prepared by mixing 4.5 grams of 3.2 ratio, 41° Be sodium silicate solution (27.5% $SiO_2$) with 119.2 grams of deionized water. Approximately 12.0 grams of Dowex HCR-W2 H+ Form, spherical beads (16-40 mesh) ion exchange resin was added to the dilute silicate solution while rapidly stirring the mixture and measuring its pH. When the dilute silicate solution pH reached 3.1 the solution was poured through a filter paper to remove the ion exchange resin. The dilute silicate solution was further acidified to 2.0 by addition of 1N HCl. ICP analysis of the dilute, partially deionized silicate solution showed it contained 4790 ppm $SiO_2$ and 14 ppm Na equivalent to a Si/Na ratio of 342. This fully deionized silicate solution was diluted to 0.6% $SiO_2$ with deionized water prior to its use in the bitumen extraction experiments.

(3) Colloidal Silica

Ludox® colloidal silica sol was obtained from WR Grace corporation. The sol is described as containing discrete particle of silica approximately 7 nm in diameter. The sol was reported to have a Si/Na ratio of 31.

Example 1

An oil sands ore was obtained from Alberta Innovates in Alberta Canada. The ore contained 7.96% bitumen by weight. The partially and fully deionized silicate solutions described above were tested as extraction aids and compared to the results obtained when using no extraction aid or 1N sodium hydroxide solution in varying amounts. Silicate solutions were added so as to introduce 0.9 grams of $SiO_2$ into the bitumen extraction unit. Deionized water was used in these experiments to disperse the ore.

TABLE 1

| Extraction Aid | S Value (%) | Dose | millimoles Na Added by Extraction Aid | Bitumen Recovery (%) |
|---|---|---|---|---|
| None | NA | NA | NA | 58.0 |
| 1N NaOH | NA | 0.45 ml | 0.45 | 59.2 |
| 1N NaOH | NA | 0.6 ml | 0.6 | 64.1 |
| 1N NaOH | NA | 0.75 ml | 0.75 | 64.3 |
| Partially Deion. Silicate Solution | 55.2 | 0.9 g SiO2 | 2.3 | 74.4 |
| Fully Deion. Silicate Solution | 58.0 | 0.9 g SiO2 | 0.05 | 63.4 |

As can be seen in Table 1 above, peak bitumen recovery when using sodium hydroxide occurred upon addition of about 0.7 millimoles of sodium. Higher bitumen recovery occurred with partially deionized silicate solution while adding only slightly more sodium. Bitumen recovery equivalent to the best sodium hydroxide results were obtained when using fully deionized silicate solution which adds 10× less sodium. By way of comparison, 9.1 millimoles of sodium would be added when using commercially available 3.2 ratio sodium silicate solution to provide 0.9 grams of $SiO_2$.

Example 2

A second oil sands ore was obtained from Alberta Research Council in Alberta, Canada. This ore contained 8.93% bitumen by weight. Ludox® colloidal silica was tested as an extraction aid and compared to the results obtained when using no extraction aid or 1N sodium hydroxide solution in varying amounts. The colloidal silica sol was added so as to introduce 0.9 grams of $SiO_2$ in the bitumen extraction unit. Deionized water was used in these experiments to disperse the ore.

TABLE 2

| Extraction Aid | S Value (%) | Dose | millimoles Na Added by Extraction Aid | Bitumen Recovery (%) |
|---|---|---|---|---|
| None | NA | NA | NA | 51.3 |
| 1N NaOH | NA | 0.45 ml | 0.45 | 60.6 |
| 1N NaOH | NA | 0.6 ml | 0.6 | 72.4 |
| 1N NaOH | NA | 0.75 ml | 0.75 | 66.2 |
| Ludox ® SM colloidal silica sol | 59.9 | 0.9 g SiO2 | 0.58 | 84.7 |

Results shown in Table 2 above demonstrate that the colloidal silica sol provided superior bitumen recovery while introducing less sodium than the best sodium hydroxide results.

Example 3

A third oil sands ore was obtained from Alberta Innovates in Alberta, Canada. This ore contained 7.60% bitumen by weight. Another partially deionized silicate solution was tested as an extraction aid and compared to the results obtained when using 0.6 ml of 1N sodium hydroxide solution. The partially deionized silicate solution was added so as to introduce 0.9 grams of $SiO_2$ in the bitumen extraction unit. Synthetic process water prepared as shown in Table 3 below was used in these experiments to disperse the ore. The synthetic process water was similar in composition to the recycled water commercially used by the oil sands operators in Alberta.

TABLE 3

| Ion | ppm | Provided as |
|---|---|---|
| Sodium | 800 | NaCl |
| Calcium | 40 | CaCl2 |
| Magnesium | 15 | MgSO4 |
| Potassium | 15 | KCl |

TABLE 4

| Extraction Aid | S Value (%) | Dose | millimoles Na Added by Extraction Aid | Bitumen Recovery (%) |
|---|---|---|---|---|
| 1N NaOH | NA | 0.6 ml | 0.6 | 54.6 |
| Partially Deion. Silicate Solution | 60.0 | 0.9 g SiO2 | 2.3 | 76.5 |

Results shown in Table 4 above demonstrate that the partially deionized silicate solution provided very good bitumen recovery when using high ionic strength water in the extraction unit.

What is claimed is:

1. A process for extracting bitumen from an oil sands ore, comprising (a) providing an aqueous slurry of an oil sands ore, and (b) contacting the slurry with a deionized silicate solution and optionally a caustic, to extract bitumen from the ore to produce i) a froth comprising bitumen, and ii) an aqueous tailings stream comprising sand and clay fines; wherein the deionized silicate solution has a molar ratio of Si:M of at least 2.6, wherein M is an alkali metal and the deionized silicate solution has a S-value of 50% or greater.

2. A process according to claim 1 further comprising (c) dewatering the aqueous tailings stream.

3. A process of claim 2 further comprising adding an anionic polyacrylamide or an anionic polyacrylamide and a low molecular weight cationic organic polymer after step (b) and before step (c) to flocculate the aqueous tailings stream.

4. A process of claim 1 wherein air is added during the contacting step (b).

5. A process according to claim 1 wherein the temperature in step (b) is 25 to 90° C.

6. A process according to claim 1 wherein the deionized silicate solution is a deionized colloidal silica.

7. A process according to claim 1 further comprising, after step (b) a step (d) permitting separation of the aqueous tailings stream into a middlings and a coarse tailings.

8. A process according to claim 7 further comprising removing the froth from the aqueous tailings and contacting the froth with solvent to extract bitumen from the froth and to produce a froth treatment tailings.

9. A process according to claim 8 wherein the solvent is selected from the group consisting of paraffinic $C_5$ to $C_8$ n-alkanes, and naphthenic solvents.

10. A process according to claim 7 further comprising contacting the middlings with air to produce a second froth, a second middlings and a fine tailings, and permitting separation of the second froth and the fine tailings.

11. A process according to claim 10 further comprising contacting the second middlings with air to produce a third froth and a second fine tailings.

12. A process of claim 1 wherein the aqueous tailings stream comprises 1) a middlings stream of unrecovered bitumen and clay fines; and 2) a coarse tailings stream comprising sand and clay fines.

13. A process according to claim 1 further comprising, after step (b) and before step (c), step (d) permitting separation of the aqueous tailings stream into a middlings and a coarse tailings wherein step (c) comprises dewatering the middlings and coarse tailings separately.

14. A process according to claim 13 further comprising removing the froth from the aqueous tailings and contacting the froth with solvent to extract bitumen from the froth and to produce a froth treatment tailings.

15. A process according to claim 14 wherein the solvent is selected from the group consisting of paraffinic $C_5$ to $C_8$ n-alkanes, and naphthenic solvents.

16. A process according to claim 10 further comprising contacting the second middlings with air to produce a third froth and a second fine tailings.

17. A process according to claim 1 wherein the deionized silicate solution is prepared by contacting a solution of sodium silicate with a strong cation exchange resin.

18. A process according to claim 1 wherein the deionized silicate solution is prepared by contacting a solution of sodium silicate with a weak cation exchange resin.

19. A process according to claim 1 wherein the deionized silicate solution is prepared by removing alkali metal from a solution of alkali metal silicate using bipolar electrolysis.

* * * * *